United States Patent [19]
Boudet et al.

[11] Patent Number: 5,133,784
[45] Date of Patent: Jul. 28, 1992

[54] PROCESS AND APPARATUS FOR SEPARATING A AT LEAST A COMPONENT OF A GASEOUS MIXTURE BY ADSORPTION

[75] Inventors: Michel Boudet, Vert Saint Denis; Jean-Marc Scudier, La Celle Saint Cloud; Xavier Vigor, Viroflay, all of France

[73] Assignee: L'Air Liquide, Societe Anonyme pour l'Etude et l'Exploitation des Procedes Georges Claude, Paris, France

[21] Appl. No.: 772,493

[22] Filed: Oct. 7, 1991

[30] Foreign Application Priority Data

Oct. 11, 1990 [FR] France .................. 90 12538

[51] Int. Cl.$^5$ ............................................. B01D 53/06
[52] U.S. Cl. ............................................ 55/25; 55/60; 55/78; 55/179; 55/390
[58] Field of Search ............ 55/25, 26, 34, 60, 61, 55/77, 78, 179–181, 390

[56] References Cited

U.S. PATENT DOCUMENTS

| | | | |
|---|---|---|---|
| 2,541,694 | 2/1951 | Galson | 55/179 |
| 2,639,000 | 5/1953 | Edwards | 55/179 |
| 3,201,921 | 8/1965 | Heyes | 55/78 X |
| 3,487,608 | 1/1970 | Gräff | 55/179 X |
| 3,757,492 | 9/1973 | Graff | 55/181 |
| 4,176,523 | 12/1979 | Rousseau | 55/390 X |
| 4,321,961 | 3/1982 | Hemsath | 55/390 X |
| 4,452,612 | 6/1984 | Mattia | 55/25 |
| 4,469,494 | 9/1984 | van Weenen | 55/179 |
| 4,522,726 | 6/1985 | Berry et al. | 55/78 X |
| 4,589,892 | 5/1986 | Leonard | 55/181 X |
| 4,612,022 | 9/1986 | Berry | 55/60 |
| 4,701,189 | 10/1987 | Oliker | 55/34 |
| 4,775,484 | 10/1988 | Schmidt et al. | 55/390 X |
| 4,778,492 | 10/1988 | Dawson | 55/78 |
| 4,803,317 | 2/1989 | Berry et al. | 55/78 X |
| 4,846,855 | 7/1989 | Tsujimoto | 55/60 |
| 4,863,497 | 9/1989 | Grenier et al. | 55/181 |
| 5,017,202 | 5/1991 | Ogata et al. | 55/390 |
| 5,057,128 | 10/1991 | Panzica et al. | 55/181 |

FOREIGN PATENT DOCUMENTS

| | | | |
|---|---|---|---|
| 54-101775 | 8/1979 | Japan | 55/181 |
| 54-125180 | 9/1979 | Japan | 55/181 |
| 54-146274 | 11/1979 | Japan | 55/181 |
| 55-024517 | 2/1980 | Japan | 55/25 |
| 2220868 | 1/1990 | United Kingdom | 55/77 |

Primary Examiner—Robert Spitzer
Attorney, Agent, or Firm—Young & Thompson

[57] ABSTRACT

A process for the separation by adsorption of at least a component of a gaseous mixture whereby the gas mixture is circulated through an adsorbent mass. A plurality of adsorbent mass compartments are provided and are arranged sectorially about and fixed to a support shaft rotating about an axis, and collection chambers are provided radially internally and externally of each adsorbent compartment. Gas circulation is provided radially through each adsorbent compartment as it rotates about a stationary gas distribution unit.

9 Claims, 3 Drawing Sheets

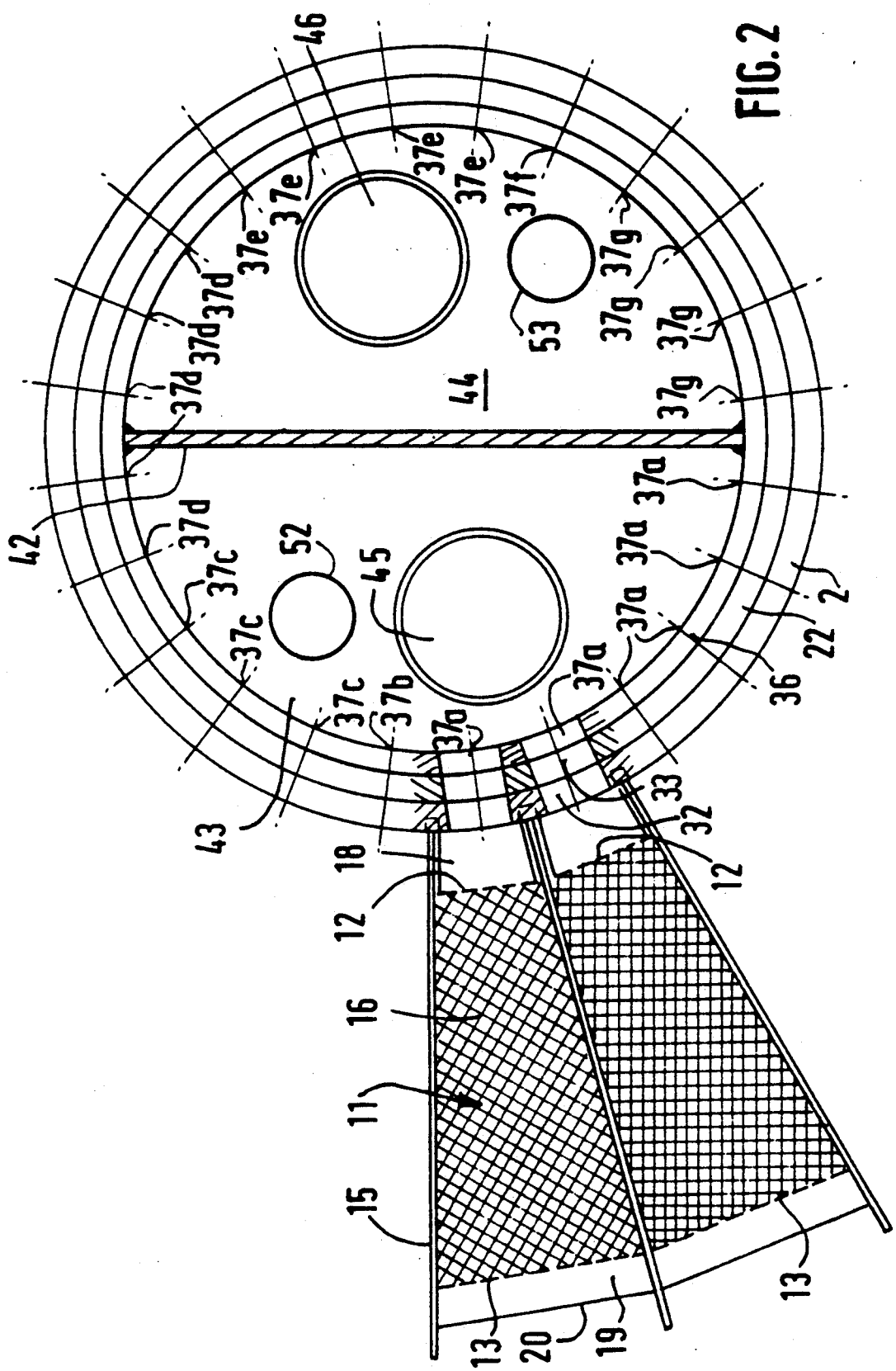

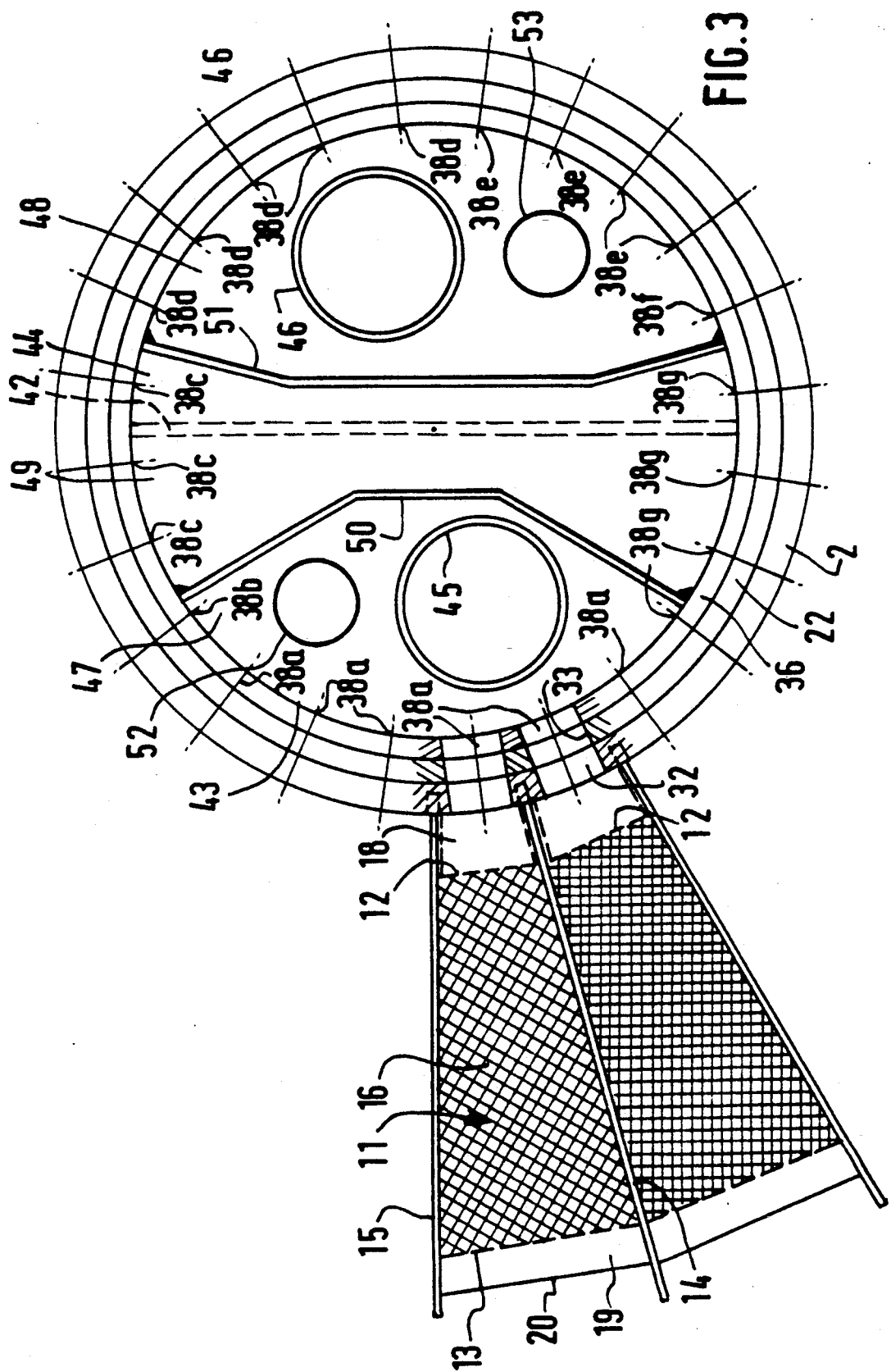

PROCESS AND APPARATUS FOR SEPARATING A AT LEAST A COMPONENT OF A GASEOUS MIXTURE BY ADSORPTION

BACKGROUND OF THE INVENTION

1. Field of the Invention

The present invention relates to a process for separating at least one component from a gaseous mixture by adsorption and to an apparatus for carrying out the process. The separation process is of the type wherein a gaseous mixture is circulated through an adsorbent mass with cyclical pressure variations, and the highest pressure level of the cycle is at least twice the lowest pressure level. The adsorbent mass is one of a plurality of adsorbent masses.

2. Description of the Prior Art

In a known adsorption process, the different adsorbent masses are placed in a plurality of drums with or without an auxiliary storage accumulator according to the pressure cycle.

The advantage of such a process is that it provides a good yield with low energy consumption. However, the productivity (measured in $Nm^3/h$ of gas produced per $m^3$ of adsorbent) remains low. The production of oxygen from the separation of air has a productivity which is presently in the area of 15 $Nm^3/h/m^3$.

In order to provide a higher performance cycle (in terms of yield and energy required for the separation), it is necessary to provide the largest possible number of drums (adsorbers) in order to operate a complex cycle, thus considerably increasing the investment cost. A compromise setup includes two or three adsorbers to produce oxygen from the separation of air.

An industrial application requires, therefore, at least two adsorbers and generally three in order to fully employ the rotating machinery, such as compressors, vacuum pumps along with the necessary piping valves, some of which must be regulator valves, and a computer to operate the cycle. However, the cost of such a unit is high, especially in the light of the cost of the adsorbent material which must thus be provided in large quantities.

In order to reduce the cost, one solution comprises the reduction of the cycle time in order that the adsorbent can be used more efficiently and thus proportionally reduce the quantity necessary per cycle. However, this poses further problems, one of which is the valves which must be operated more often, thereby increasing the wear because they have to be opened and closed in very brief periods, thus increasing their cost. Furthermore, the frequency of attrition through wear of the adsorption material requires that the contact surfaces be increased and that the height of the adsorbent material bed be reduced which leads to complex and expensive adsorbers. As far as attempting to maintain high performance is concerned, it is noted that the adsorption kinetics is penalized when a short duration is required, and in order to overcome this problem, the granulometry of the particles of the adsorbent material must be reduced, which thus aggravates the previously mentioned problems.

Actually, to our knowledge, there is no industrial installation of this type having an oxygen production above 5 tons per day which utilizes a cycle of less than $2 \times 45$ seconds with two adsorbers.

In order to overcome these inconveniences, a certain number of solutions have been proposed but have not led to date to industrial applications.

One such solution which has been proposed utilizes a process of very rapid pressure variations or processes referred to as "Parametric Pumping". Such processes use a very short cycle (less than 1 second to a few seconds) on adsorbent beds of adsorbent particles of fine granulometry. The separation of oxygen from air in particular can be obtained by pressure waves. This process allows very high productivity in the 100 $Nm^3/h/m^3$ range, but it is very costly energy-wise and has a low yield. Moreover, the attrition phenomenon of the adsorbent is worrisome, and switching valves are required which can perform sometimes every 1/10th of a second.

Rotating valves or distributors exist which feed adsorbers disposed in a circle or cylindrical adsorbers arranged in angular sectors in order to reduce the number of valves and piping and bring the process to more or less a continuous process. However, the gas circulation in these devices is generally longitudinal of the adsorber. Thus, the cycle duration is lengthy, and the resulting cycles are rudimentary, utilizing a rotating distributor technology and thus of low performance. The productivity of such devices is comparable to conventional processes.

A rotary adsorber is also known which functions intermittently and is divided up in angular sectors, with longitudinal circulation of the gas. The quantity and quality of the adsorbent sieves located in the center thereof for an industrial setup are incompatible with rotary technology. An ozone production system has been described in International Patent Application PCT WO 86/06056 using an adsorption separation to separate ozone from a mixture of oxygen and ozone, in which there is a diagram showing the adsorbent material arranged in sectorial compartments rotating around a vertical axis with horizontal circulation of the gas. However, such a system requires considerable fine tuning if it is desired to implement such a process with its high pressure variations between the highest pressure level and the lowest pressure level of the cycle as well as the provision of much more elaborate cycles.

SUMMARY OF THE INVENTION

It is an object of the present invention to include all of the advantages of the proposed solutions into an adsorption system with pressure variations while avoiding the disadvantages, that is, to have high productivity with high performance and low investment costs while providing an industrial application which is reliable.

It is an object of the invention to apply such a process in a system where the highest pressure level of the cycle is at least twice the value of the lowest pressure level in the cycle, and the adsorbent is provided in several sectorially separated masses disposed around a rotary support shaft about the axis of the shaft. Opposed gas collector chambers extending longitudinally are provided with one of the collector chambers located radially inwardly relative to the sectorially disposed adsorbent mass, and another collector chamber is provided radially exteriorly of the sectorially disposed mass whereby the rotation of the shaft in such a continuous process is between 2 and 20 rotations per minute.

The invention is also directed to an apparatus of the type including a plurality of individual adsorbers including means for feeding and bleeding gases through the individual adsorbers and wherein the adsorbers are in the form of angular sectorial compartments arranged longitudinally side by side and fixed to a shaft rotatable about an axis. Each sectorial compartment is provided with a longitudinal collector chamber arranged radially inwardly thereof, and a longitudinal collector chamber is arranged radially exteriorly thereof communicating by way of passages, successively, with different distributor chambers including supply, purging chambers for certain passages, production, counterbalancing and scavenging and/or final pressurization for other passages.

The invention contemplates the application of many separation cycles from the simplest to the most complicated.

Preferably, the different distributor chambers are grouped in a cylindrical distribution housing arranged in the interior of the shaft-bearing combination supporting the adsorbent compartments.

Very complex cycles can thus be applied resulting in very high performance, depending on the number of compartments which are selected, including adsorption zones, counterbalancing zones, purging zones, elution zones, and recompression zones, etc. Such complex cycles could never be obtained according to present technology without having a large number of drums or vessels which would, of course, increase the investment costs because of the necessary number of valves and pipes which add as well to crowding.

Preliminary tests have shown that the cycle duration can be reduced to 9 seconds with an adsorbent, i.e., fine alumina particles having a granulometry of less than 1.7 mm, providing productivity above 100 $Nm^3/h/m^3$ and a yield of over 30% of oxygen in the separation of air.

Finally, to avoid problems of pressure loss, the radial thickness of the adsorbent through which the gas passes horizontally is minimal. Tests have shown that to ensure a good separation of the gaseous mixture, this radial thickness of the adsorbent mass must not be less than 30 cm using present-day adsorbents for the production of oxygen.

It has been noted in particular that the horizontal circulation considerably reduces the rate of attrition of the adsorbent mass.

The process in accordance with the invention is continuous, without valves, piping, computer, or regulators.

Accordingly, such an adsorber can be made as modules which can yield 10 tons per day of oxygen on less than 3 $m^3$ of adsorbent in a vessel having a diameter of 2 m and a height of 2 m, including in each module the necessary machines, such as compressors, vacuum pumps if necessary. The number of adsorption modules can be increased if a larger production of oxygen is necessary. For instance, five rotary adsorber modules would be necessary to produce 50 tons per day.

A modular construction provides for a continuous maintenance of the equipment, i.e., only one of the adsorbers may be shut down at a time when several modules are set up, and a greater flexibility of product flow can be attained between 0 and 100%, adjusting the speed of rotation, and the purity of the product can be adjusted from between 22 to 95%. This is impossible using traditional equipment of the type using drums and valves, where the simple replacement of a valve requires a total shut-down as compared to the present invention which allows flexibility in the flow which can allow for very complex maintenance planning.

BRIEF DESCRIPTION OF THE DRAWINGS

Having thus generally described the nature of the invention, reference will now be made to the accompanying drawings, showing by way of illustration, a preferred embodiment thereof, and in which:

FIG. 2 is a horizontal cross-section, taken along line $F_2$—$F_2$ of FIG. 1; and FIG. 3 is a horizontal cross-section, taken through line $F_3$—$F_3$ of FIG. 1.

DESCRIPTION OF THE PREFERRED EMBODIMENTS

Figure 1:
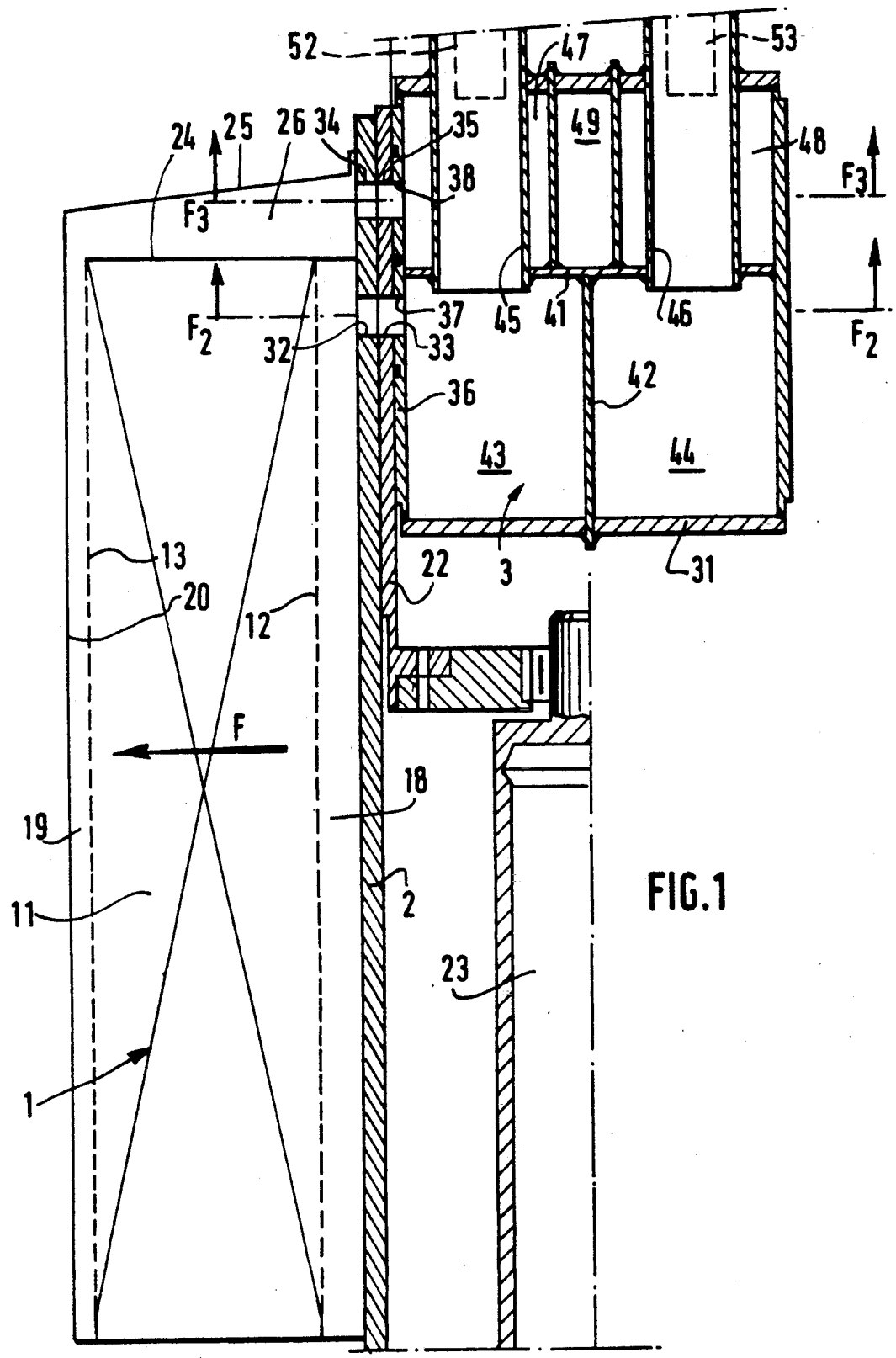
FIG. 1 is a fragmentary vertical cross-section of an apparatus for separation according to the present invention.

Referring to the accompanying drawings, a typical installation of the present invention is shown, including an adsorption unit 1 mounted on a rotary support shaft 2 extending in a vertical axis combined with a stationary gas distribution device 3.

The adsorption unit 1 is an annular shaped housing surrounding the shaft 2, including a plurality of angular compartments 11 arranged around and fixed to the shaft 2 and having a longitudinal extent which is roughly the same height as the extent of the support shaft 2. Each compartment 11 has a trapezoidal outline in the horizontal plane as shown in FIGS. 2 and 3, with an inner partition 12 and an outer partition 13 defined by concentric circles to the axis of the support shaft 2. Radially extending walls 14 and 15 define the side walls of the identical compartments 11 and are fixed to the support shaft 2. The compartments 11 are filled with adsorbent material 16. The inner partitions 12 and outer partitions 13 are in the form of perforated panels or grills in order to allow the passage of the gas. The radial walls 14 and 15 are flat uninterrupted walls extending radially from the support shaft 2, to the exterior beyond the partitions 13. For each compartment 11, a first gas collection chamber 18 is defined by the outer wall of the support shaft 2, portions of the radial walls 14 and 15, and the inner perforated partition 12. The second gas collector chamber 19 is formed between the outer perforated partition 13, the extension of the radial side walls 14 and 15, and the outer concentric wall 20 of the vessel.

In accordance with the present embodiment, the angular extent of each compartment 11 is 15°, such that there are 24 compartments 11 surrounding the support shaft 2.

Support shaft 2 is hollow and is fixed on an annular bearing 22 which, in turn, is mounted for rotation on a vertical stub shaft 23. The continuous rotary movement of the support shaft 2 around the stub shaft 23 is provided by suitable electric motor and gears which are not shown.

The gas distribution device 3 is made up of a cylindrical housing 31 mounted in a sealing, sliding relationship within the hollow bearing 22. The upper edge of the bearing 22 and the support shaft 2 are stepped above the top wall 24 of the compartments 11.

The radial side walls 14 and 15 of the different compartments 11 extend upwardly to form with the outer wall 20 and a radially extending annular wall 25, individual conduits 26 which are essentially radial and which communicate with the external gas collection chambers 19 associated with each compartment 11. There are as many individual conduits 26 as there are compartments 11.

The internal collecting chambers 18 communicate with the housing 31 by means of aligned openings 32 in the wall of the shaft 2 and a corresponding opening 33 in the bearing wall 22. Each series of aligned openings is equal in number to the number of compartments 11. Likewise, the exterior gas collecting chambers 19 communicate with the housing 31 by means of radial conduits 26 through a second series of aligned openings 34 in the wall of the shaft 2 and 35 in the wall of the bearing 22. An equal number of aligned openings 34 and 35 correspond to the number of conduits 26 and the compartments 11.

The housing 31 includes a cylindrical wall 36 and a double series of openings 37 and 38 having the same angular alignment as the openings 32, 33 and 34, 35, and located at the respective levels.

The housing 31 is itself sub-divided into several chambers by means of a horizontally extending transverse wall 41 extending intermediate the housing between the series of openings 32, 33 and 37, on the one hand, and 34, 35 and 38, on the other hand. Below the horizontal wall 41 is a vertical median wall 42. It is understand that during the course of the simultaneous rotation of the support shaft 2 and the bearing 22, the openings 37 in the two sub-compartments 43 and 44 defined by the walls 41 and 42, successively align themselves to correspond with the different openings 32 and 33. The sub-compartment 43 is connected by means of tube 45 to a gaseous mixture source to be treated, while the sub-compartment 44 is connected through tube 46 to a means for evacuating the residual gases.

The upper part of the housing 31, at the level of the moving openings 34 and 35 and the openings 38 in the housing, is itself sub-divided into three sub-compartments 47, 48, and 49 by two walls 50 and 51 extending longitudinally relative to an axial median plane (see FIG. 3).

The sub-compartment 47 over the sub-compartment 43 is connected to the exterior by means of tube 52 for evacuating the gas product, while the sub-compartment 48 is connected by means of tube 53 to a gas product storage means, and the sub-compartment 49 is a counterbalancing compartment without any external communication other than openings 38.

The method of operation of the installation is as follows:

During the rotation of the mobile portion of the apparatus which includes the bearing 22, support shaft 2, and the compartments 11, each compartment 11 is exposed to the following phases: a pressurized production phase while the openings 32, 33, on the one hand, and 34, 35, on the other hand, are aligned with openings 37 and 38 respectively in the distribution housing 3, that is, with respective sub-compartments 43 and 47 (in FIGS. 2 and 3 these openings are designated 37a and 38a respectively). A gaseous mixture to be treated is introduced via tube 45 into the sub-compartment 43 and then through the aligned openings 37 (37a), 33, and 32, to be directed into the internal gas collection chamber 18, then to flow substantially horizontally and radially to the exterior through the adsorbent mass 16 of a compartment 11 to exit into the external gas collecting chamber 19, then through the conduits 26 towards the sub-compartment 47, via the openings 34, 35, 38 (38a), and then to be evacuated by means of tube 52.

It is interesting to note that at this production phase, several compartments 11 are simultaneously and successively aligned as described. Accordingly, the sub-compartments 43 and 47 cover an angle which includes six openings 37 (37a) of the supply sub-compartment 43 and equally six openings 38 (38a) of the evacuation sub-compartment 47, from a total of 24 openings. It is to be understood that six compartments 11 are always simultaneously in production phase, and as soon as one compartment 11 leaves the alignment with the opening 37 (37a) of the supply sub-compartment 43 and the opening 38 (38a) of the sub-compartment 47, another compartment 11 comes into alignment with the first opening 37 (37a) of the supply sub-compartment 43, and thus the perforation 38 (38a) communicates that compartment 11 with the evacuation sub-compartment 47.

Since the rotary movement of the mobile assembly (compartments 11, shaft 2, bearing 22) is here described as a continuous rotary movement, it is important that the time of alignment and communications of the compartments 11 with the supply and evacuation phase be at the maximum. In other words, the time element that the compartments are closed off, that is, between two openings 37a or 38a, should be reduced to a minimum, and preferably eliminated such that, in the case of circular openings, the space between succeeding openings 37 and 38 be as small as possible. Accordingly, the diameter of openings 37 and 38 should be sufficiently large such that a set of openings be constantly aligned (32, 33 or 34, 35) and always be successively in communication with the supply sub-compartment 43 or evacuation sub-compartment 47 respectively, by the fact that during a fraction of the duration of rotation which causes angular displacement, there is always one of the openings gradually coming in alignment with an opening 37, 38, while another opening 32, 33, 34, 35, is gradually closing with respect to openings 37, 38. Thus, there is always a gradual closing and gradual opening of such openings.

It is noted that in such cases the passage from one operating phase to the following, for example, from the production phase, just described, to the depressurization phase by counterbalancing which follows, a transitional shutting-off simultaneously of the passage from the production to the counterbalancing sub-compartments can be obtained by simply closing one of the transitional passages 37, 38 of the distribution housing 31 as indicated at 37b, 38b in FIGS. 2 and 3.

The method of depressurization by counterbalancing will now be described. While the openings 34, 35 align themselves with openings 38 (designated 38c in FIG. 3) at the counterbalancing sub-compartment 49, the corresponding openings 37 (37c) of the supply sub-compartment 43 are either non-existent or are closed off when the counterbalancing sub-compartment is in communication. The gas retained in the adsorbent mass 16 is exhausted, in the direction of arrow F, horizontally, radially towards the collecting chamber 19, conduit 26, openings 34, 35, 38 (38c), the counterbalancing chamber 49 to pressurize partially three compartments 11 shifting angularly and which terminate after purging the pressurization stage by counterbalancing.

It is noted that there are as many succeeding counterbalancing phases as there are counterbalancing chambers 49 (in the present drawings only one sub-compartment 49 is illustrated). For example, the counterbalancing sub-compartment 49 can be further subdivided longitudinally into three individual counterbalancing sub-compartment providing a first depressurization by counterbalancing with a final pressurization by counterbalancing; a second depressurization by counterbalancing with a second pressurization by counterbalancing; and a final depressurization by counterbalancing with a first pressurization by counterbalancing.

A purging phase or decompressurization at the low pressure level of the cycle is provided when the openings 37 (37d) via the sub-compartment 44 (the associated openings 38 (38d) are then neither non-existent or closed) are aligned. The residual gas flows countercurrently, horizontally but radially towards the interior to the internal gas collecting chamber 18, the openings 32, 33, 37 (37d), in the purging sub compartment 44, and then towards the tube 46.

An elution phase is provided when the openings 34, 35 communicate with the openings 38 (38e) of the elution chamber 48, while the perforations 32, 33 are always at the level of openings 37e in the purging chamber. The elution gas or production gas flows thus through conduit 53 towards the elution chamber 48 and from there through conduits 26 and the external gas collecting chambers 19 to scavenge in the opposite direction of the feed, that is, horizontally and radially towards the interior, countercurrently, through the adsorbent 16 before being evacuated through the interior gas collection chambers 18, the openings 32, 33, 37, purge chamber 44, and the tube 46.

In a further pressurization phase by counterbalancing as described in reference to the previous pressurization phase by counterbalancing, the openings 38g cooperate with the openings 38c through the counterbalancing sub-compartment 49.

A final pressurization phase is provided when the openings 34, 35 are aligned with perforations 38g of the gas chamber 47, while the openings 32, 33 are aligned with non-existent or closed openings 37g such that the gas to be treated at a high pressure level of the cycle is pressurized countercurrently at this high pressure in a compartment 11 by passage through the sub-compartment 47, the conduit 26, and the exterior gas collecting chamber 19.

The process and the apparatus according to the invention can be applied differently than already described. The different openings for the mobile assembly can be in the form of a plurality of longitudinal slots. However, from the stationary distributor, the different passages of a particular sub-compartment can be in the form of an annular slot. As well, the distributor can be designed to ensure admission from the external radial side of the gas to be treated and bled radially internally of the production gas.

The distribution assembly (stationary distributor and the mobile unit) could also, in order to improve the sealing and centering of the device, be in a generally conical shape.

The invention can be applied to the separation of air for the production of oxygen, nitrogen, and as well for the production of hydrogen, carbonic gases, and many other gases coming from different mixtures.

We claim:

1. A process for separation by adsorption of at least one component of a gaseous mixture, including circulating the gaseous mixture through an absorbent mass, providing cyclical pressure variations to the process wherein the pressure at its highest value in the cycle is at least twice the value of the pressure at its lowest level in the cycle, and wherein the adsorbent mass is arranged in a plurality of sectorial compartments set out around an axis, and gas collection chambers are provided in the longitudinal direction radially inwardly of the sectorial compartments and radially through the adsorbent mass, and arranging for a rotary successive supplying and evacuation of gas, wherein the speed of rotation is continuous and is between 2 and 20 rotations per minute.

2. A process as defined in claim 1, wherein said gaseous mixture is air and said at least one component is an industrial oxygen.

3. An assembly for the separation of a gas mixture by adsorption, comprising a plurality of individual adsorbers, means for supplying and evacuating a gas through each individual adsorber, each adsorber being in the form of an angular sectorial compartment extending longitudinally side by side around and fixed to a shaft means mounted for rotation about an axis making up a mobile sub-assembly, each adsorption compartment including a radially internal collection chamber extending longitudinally and a radially exterior collection chamber extending longitudinally, each of the collection chambers communicating successively with a stationary gas distributor having a plurality of sub-compartments, wherein the stationary gas distributor includes a cylindrical wall in which are provided first passages, the wall being in sealing sliding contact with the wall of the mobile sub-assembly including the adsorbent compartments, and corresponding openings in the mobile assembly adapted to communicate when aligned with said first passages in said cylindrical wall of the gas distributor through the collection chambers corresponding to each adsorbent compartment.

4. An assembly as defined in claim 3, wherein the wall of the gas distributor which is in sealing sliding contact with the wall of the mobile assembly are both cylindrical walls coaxial with the rotating shaft.

5. An assembly as defined in claim 3, wherein the gas distributor is provided with a plurality of sub-compartments including a gas supply sub-compartment and a purging sub-compartment adapted to be in communication with a first set of openings in the mobile assembly wall, and a sub-compartment for evacuating the gas production, a counterbalancing sub-compartment, and a gas scavenging sub-compartment adapted to be in communication with a second set of openings in the mobile assembly wall.

6. An assembly as defined in claim 5, wherein the different sub-compartments are arranged in a cylindrical distribution housing mounted within the rotating support shaft to which the mobile assembly, including the adsorbent compartments, is fixed.

7. An apparatus for separation by adsorption of at least one component of a gaseous mixture, comprising a plurality of adsorption units, each including an adsorbent mass, and means for sequentially feeding and withdrawing gas to the different adsorption units, wherein the adsorption units each comprise an angular sector and are arranged in a tubular annular envelope and defining for each adsorption unit a longitudinally extending collection chamber internal of the adsorption mass and a longitudinally extending collection chamber externally of the adsorption mass which in turn communicates with a conduit at one end thereof, the annular tubular envelope being mounted for rotation about an axis on a stationary housing having an external tubular surface cooperating in sliding contact with the internal surface of the annular envelope, the stationary housing defining axially disposed first and second sets of sub-compartments, and provided respectively with a first and second set of openings in the exterior surface of the stationary housing and cooperating selectively with a first and second respective series of angular openings set out in the internal surface of the annular envelope and communicating respectively with the internal longitudinal collection chambers and the conduits at the end of the external collection chambers.

8. An apparatus as defined in claim 7, wherein the first set of sub-compartments comprises a sub-compartment for the distribution of the gas mixture and a separate purging sub-compartment arranged in semi-cylindrical form and adjacent each other, and the second set of sub-compartments includes a first angular sector to evacuate the gas being separated, and a second elution sub-compartment formed in an angular sector separated from the gas evacuation sub-compartment by a counter-balancing sub-compartment.

9. An apparatus as defined in claim 8, wherein the sub-compartments of the first set of sub-compartments and the sectorial sub-compartments of the second set of sub-compartments communicate with external circuits by means of axial conduits extending from each sub-compartment.

* * * * *